(12) United States Patent
Guddeti et al.

(10) Patent No.: US 9,189,441 B2
(45) Date of Patent: Nov. 17, 2015

(54) DUAL CASTING PCIE INBOUND WRITES TO MEMORY AND PEER DEVICES

(71) Applicant: INTEL CORPORATION, Santa Clara, CA (US)

(72) Inventors: Jayakrishna Guddeti, Bangalore (IN); Luke Chang, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 13/656,134

(22) Filed: Oct. 19, 2012

(65) Prior Publication Data

US 2014/0115223 A1     Apr. 24, 2014

(51) Int. Cl.
G06F 13/14      (2006.01)
G06F 13/40      (2006.01)

(52) U.S. Cl.
CPC .............. *G06F 13/404* (2013.01); *G06F 13/14* (2013.01); *G06F 2213/0026* (2013.01)

(58) Field of Classification Search
CPC ......... G06F 13/00; G06F 13/10; G06F 13/12; G06F 13/14; G06F 13/16; G06F 13/20; G06F 13/38; G06F 13/42; G06F 13/4265; G06F 13/4282; G06F 11/2053; G06F 11/2056; G06F 13/40; G06F 13/4004; G06F 13/4022; G06F 13/4027; G06F 13/404; G06F 2213/0026
USPC ................. 710/300, 105–106, 305–307, 311, 710/313–316; 711/118–120
See application file for complete search history.

(56) References Cited

U.S. PATENT DOCUMENTS

| | | | |
|---|---|---|---|
| 8,271,604 B2 | 9/2012 | Freimuth et al. | |
| 2005/0226238 A1 | 10/2005 | Hoskote et al. | |
| 2008/0025289 A1 | 1/2008 | Kapur et al. | |
| 2008/0065796 A1 | 3/2008 | Lee et al. | |
| 2010/0115228 A1 * | 5/2010 | Parker et al. | 711/203 |
| 2011/0238909 A1 | 9/2011 | Kumar et al. | |
| 2011/0282963 A1 * | 11/2011 | Shimahara et al. | 709/217 |
| 2013/0254487 A1 * | 9/2013 | Tanaka et al. | 711/123 |
| 2014/0059266 A1 * | 2/2014 | Ben-Michael et al. | 710/313 |

FOREIGN PATENT DOCUMENTS

WO      2014/062247 A1      4/2014

OTHER PUBLICATIONS

"QLE7340 Single-Port 40Gbps (QDR) InfiniBand® to PCI Express Adapter". QLogic Corporation. 2010.*

(Continued)

*Primary Examiner* — Thomas J Cleary
(74) *Attorney, Agent, or Firm* — Law Office of R. Alan Burnett, PS

(57) ABSTRACT

Methods and apparatus for supporting dual casting of inbound system memory writes from PCIe devices to memory and a peer PCIe device. An inbound system memory write request from a first PCIe device is received at a PCIe root complex and the memory address is inspected to determine whether it falls within an address window defined for dual casting operations. If it does, an IO write request is generated from the inbound system memory write request and sent to a second PCIe device associated with the address window. During a parallel operation, the original inbound system memory write request is forwarded to a system agent configured to receive such write requests.

27 Claims, 5 Drawing Sheets

(56) References Cited

OTHER PUBLICATIONS

Blake, Bob. "Choosing the Right Programmable Logic Solution for PCI Express Applications". RTC Magazine. Online Apr. 2005. Retrieved from Internet Jan. 29, 2015. <http://www.rtcmagazine.com/articles/view/100327>.*

Poland, Ashley. "What Is a PCI Express Root Port?". eHow. Online Dec. 9, 2010. Retrieved from Internet Jan. 9, 2015. <https://web.archive.org/web/20110222000156/http://www.ehow.com/facts_7623569_pci-express-root-port.html>.*

International Search Report and Written Opinion received for International Application No. PCT/US2013/046108, mailed on Sep. 17, 2013, 15 pages.

International Preliminary Report on Patentability and Written Opinion received for Patent Application No. PCT/US2013/046108, mailed on Apr. 30, 2015, 8 pages.

* cited by examiner

US 9,189,441 B2

DUAL CASTING PCIE INBOUND WRITES TO MEMORY AND PEER DEVICES

TECHNICAL FIELD

The field of invention relates generally to computer systems and, more specifically but not exclusively relates to dual casting of inbound writes from PCIe devices to memory and peer devices.

BACKGROUND ART

Computer systems typically employ one or more interconnects to facilitate communication between system components, such as between processors and memory. Interconnects and/or expansion interfaces may also be used to support built-in and add on devices, such as IO (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended Industry Standard Architecture) and VESA Local Bus. In the early 1990's Intel Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates where increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO.

Another standard serial interconnect that is widely used is PCI Express, also called PCIe, which was introduced in 2004 under the PCIe 1.0 standard. PCIe was designed to replace older PCI and PCI-X standards, while providing legacy support. PCIe employs point-to-point serial links rather than a shared parallel bus architecture. Each link supports a point-to-point communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's personal computers. PCIe is an industry standard managed by the PCI-SIG (Special Interest Group).

Recently, the PCI-SIG added a standard specification for PCIe multicasting. Under PCIe multicasting specification defined in section 6.14 of PCI Express® Base Specification Revision 3.0 Version 1.0, a PCIe initiator device can write to multiple PCIe targets using a single write transaction. However, the PCIe multicasting specification does not define how to concurrently implement writes from PCIe initiator device to system memory and to peer PCIe device using a single write transaction. In addition, the PCIe multicasting specification adds complexities to various PCIe devices that must be configured to support this additional functionality. In contrast, it would be advantageous to be able to perform dual casting to system memory and a peer PCI device in a manner that has minimal impact on the entities involved in such transactions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DESCRIPTION OF THE EMBODIMENTS

Embodiments of methods and apparatus for supporting dual casting of inbound writes from PCIe devices to memory and peer PCIe devices are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
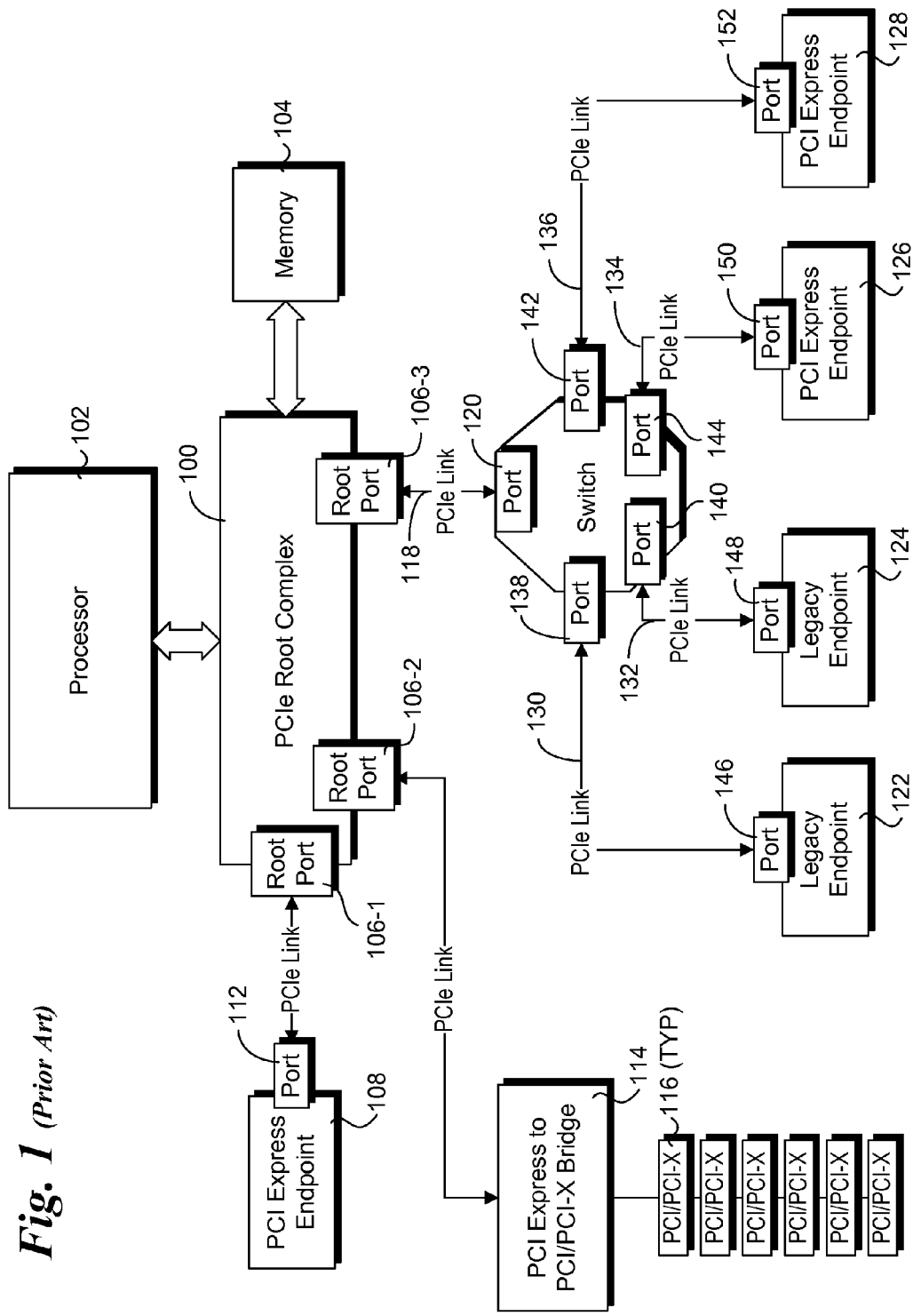
FIG. 1 is a diagram of a generic PCIe architecture.

The embodiments disclosed herein relate to methods and apparatus for supporting dual casting of inbound writes from PCIe devices to memory and peer PCIe devices. To better understand aspects of the embodiments, the following brief discussion of a generic PCIe architecture illustrated in FIG. 1 is provided.

At the heart of the PCIe architecture in a PCIe Root Complex (RC) 100 coupled to a processor 102 and memory 104. The PCIe RC 100 is depicted as including three Root Ports 106-1, 106-2, and 106-3. Root Port 106-1 is connected to a PCI Express endpoint 108 via a PCIe link 110 and a PCIe port 112. Root Port 106-2 is connected to a PCI Express to PCI/PCI-X bridge 114, which is used as an interface between PCIe and a plurality of PCI/PCI-X devices 116. Root Port 106-3 is connected to a switch 116 via a PCIe link 118 and a PCIe port 120. Switch 116 is depicted as connected to a pair of legacy endpoints 122 and 124, and a pair of PCI Express endpoints 126 and 128. This connections are facilitated by PCIe links 130, 132, 134 and 136, and ports 138, 140, 142, 144, 146, 148, 150, and 152.

A Root Complex denotes the root of an IO (Input/Output) hierarchy that connects the CPU/memory subsystem to the IO. As illustrated in FIG. 1, a Root Complex may support one or more PCI Express Ports. Each interface defines a separate hierarchy domain. Each hierarchy domain may be composed of a single Endpoint or a sub-hierarchy containing one or more Switch components and Endpoints. A Root Complex may optionally support routing of peer-to-peer transactions between hierarchy domains.

Endpoint refers to a type of Function that can be the Requester or Completer of a PCI Express transaction either on its own behalf or on behalf of a distinct non-PCI Express device (other than a PCI device or Host CPU), e.g., a PCI Express attached graphics controller or a PCI Express-USB host controller. Endpoints are classified as either legacy, PCI Express, or Root Complex Integrated Endpoints.

PCIe supports a point-to-point interconnect using serial links made up of one or more lanes for each of transmission and receiving. A PCIe link has at least one lane—each lane represents a set of differential signal pairs (one pair for transmission, one pair for reception). To scale bandwidth, a link may aggregate multiple lanes denoted by xN where N may be any of the supported link widths. For example, as of the PCIe 3.0 specification, PCIe links include operations for x1, x2, x4, x8, x12, x16, and x32 lane widths. During hardware initialization, each PCI Express link is set up following a negotiation of lane widths and frequency of operation by the two agents at each end of the link.

Figure 2:
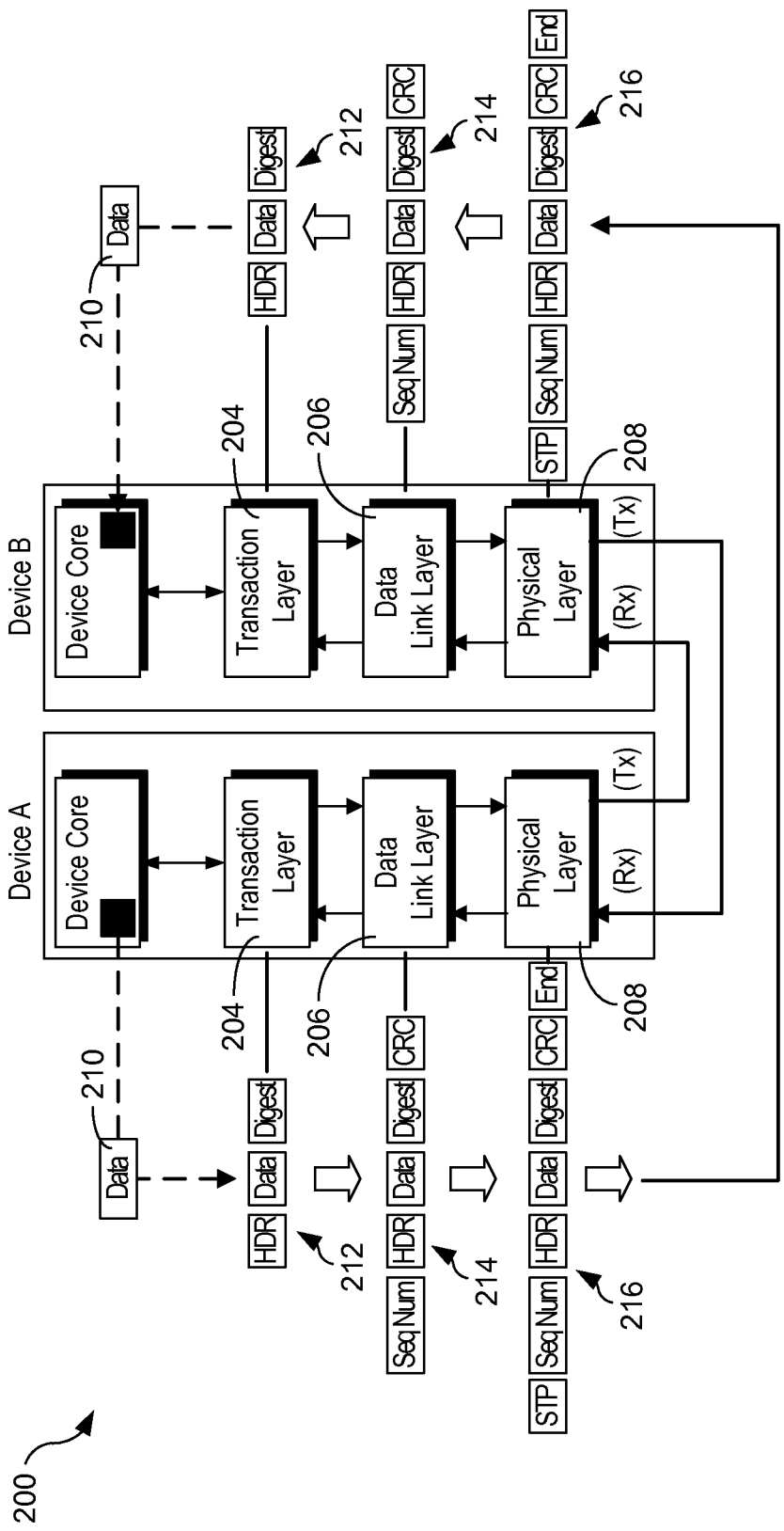
FIG. 2 is a diagram illustrating the layers of a PCIe stack and details of packet assembly/disassembly at each layer.

Diagram 200 of FIG. 2 shows details of the PCI Express layered protocol and TLP (Transaction Layer Packet) Assembly/Disassembly. Under PCIe, data is transferred in a packetized form between two PCIe endpoints or ports, as depicted by a Device A, and a Device B. As discussed above, PCIe links comprise single or multi-lane point-to-point interconnects. Moreover, the point-to-point interconnects are configured in unidirectional point-to-point interconnect pairs in opposing directions such that each link pair supports bi-directional communication. Transfers originate from a sender or transmitter, and are received by a receiver. Data that is being sent is transmitted over a transmit (Tx) path and corresponding data is received over a receive (Rx) path. The two major classes of packets exchanged between PCIe devices are high level Transaction Layer Packets (TLPs), and low-level link maintenance packets called Data Link Layer Packets (DLLPs). Collectively, the various TLPs and DLLPs enable two PCIe devices to perform memory, IO, and configuration space transactions reliably and use messages to initiate power management events, generate interrupts, report errors, etc.

The three lower layers of the PCIe standard include a Transaction Layer, a Data Link Layer, and a Physical (PHY) layer. Accordingly, each of Devices A and B are depicted as including a transaction layer (block) 204, a data link layer (block) 206, and a physical layer (block) 208. An initiator device (e.g., Device A in this example), generates data 210 to be sent to a recipient device (e.g., Device B), which is then packetized by the PCIe layers and transmitted over the link. In the context of a PCIe transaction, the initiator is called the Requester, and the recipient is called the Completer.

At the Transaction Layer, the data is packetized into one or more packets having a packet format 212 including a Header (HDR), the packet payload data (Data), and a Digest. At the Data Link Layer a Sequence Number (SeqNum) is added to the beginning of the packet, along with a CRC appended to the end to form a packet format 214. The packet format is further augmented at the Physical Layer by adding STP and End control (K) characters to form a packet format 216. The packet is then sent over the link to be processed by the receiver (Device B) using the reverse sequence, eventually yielding the original data 210.

Figure 3:
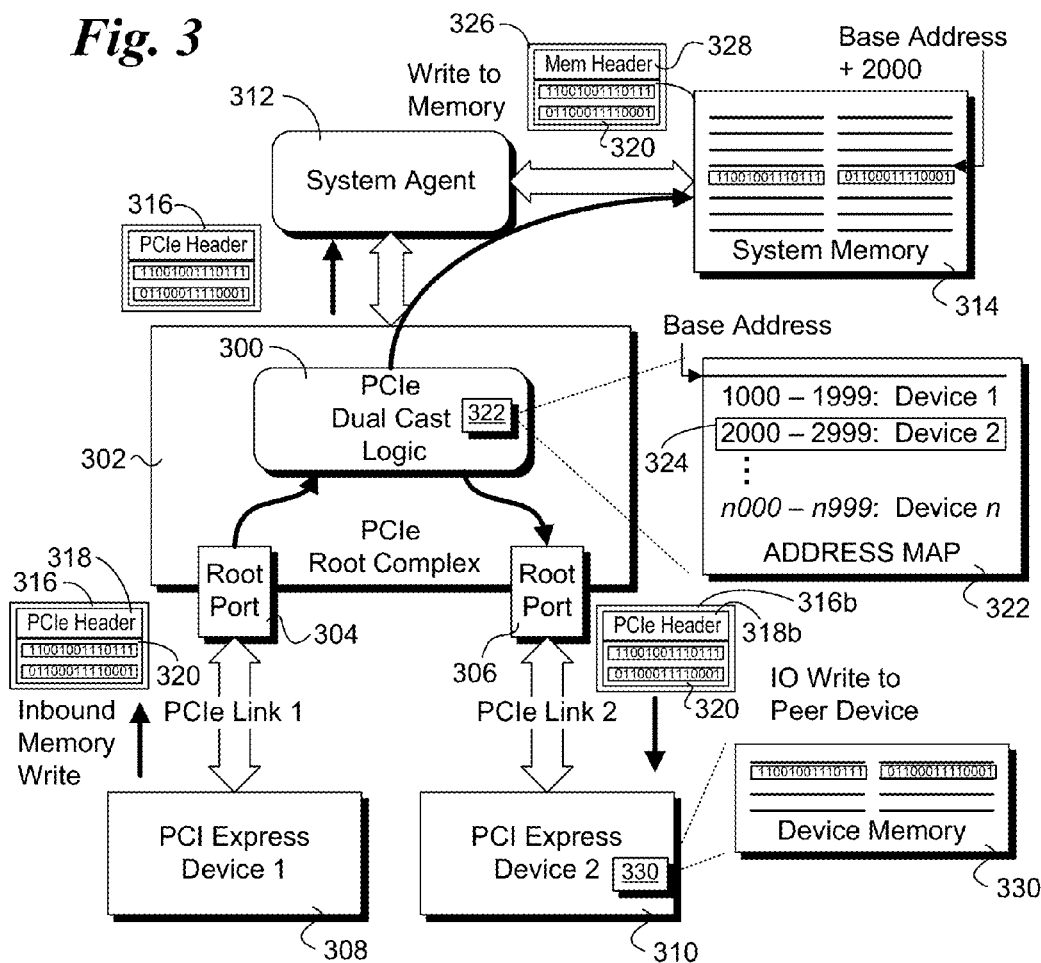
FIG. 3 is a combination schematic block and message flow diagram illustrating dual casting of an inbound memory write transaction to system memory and to a PCIe peer devices, according to one embodiment.

FIG. 3 shows an exemplary implementation of dual casting of inbound memory writes, according to one embodiment. Core functionality to support dual casting is implemented via a PCIe dual cast logic block 300 in a PCIe root complex 302. The PCIe root complex is depicted as including two root ports 304 and 306 to which respective PCIe devices 308 and 310 (also labeled and referred to as PCIe devices 1 and 2) are linked in communication via PCIe links 1 and 2. The diagram of FIG. 3 further includes a system agent 312 and system memory 314.

PCIe device 308 generates a Transaction Layer Packet (TLP) 316 comprising an inbound (system) memory write including a PCIe header 318 and data 320 comprising two cache lines. TLP 316 is forwarded from PCIe device 308 via PCIe link 1 to PCIe root complex 302, where it is received at root port 304 and forwarded to PCIe dual cast logic block 300. In response to receiving TLP 316, PCIe dual cast logic block 300 inspects PCIe header 318 of the packet, and identifies it as an inbound write to memory based a corresponding value in a Type field (see FIG. 5 for further details of TLP header fields).

Under aspects of the embodiments disclosed herein, operations for performing dual casting of selective PCIe inbound memory writes addressed to system memory addresses within corresponding address windows (i.e., ranges of addresses) are facilitated by PCIe dual cast logic block 300. In one embodiment, a dual cast inbound write address map 322 is employed to determine: a) whether dual casting operations are applicable; b) if so, what PCIe device corresponds to the dual cast (peer) target device; and c) how address translation is to be implemented. As illustrated, dual cast inbound write address map 322 includes multiple address ranges comprising respective address windows 324. In general, the address ranges may be explicitly defined using full addresses (meaning, e.g., full 32-bit or 64-bit addresses defining the range for each address), using a base address in combination with address offsets, or using another scheme via which address windows may be specified and derived. For example, the example mapping illustrated by dual cast inbound write address map 322 employs a base address plus address ranges that are offset from the base address. In one embodiment, each offset address range has a fixed size, and the offset address range is simply a multiple of an integer multiplier of the fixed size. For example, the top two address ranges in dual cast inbound write address map 322 have a size of 1000, and are numerically adjacent. As depicted by the last range n000-n999, these address ranges could be simply defined by an integer n. To derive the address range, the integer n would be multiplied by the nominal address window size. Moreover, the same integer n could define a corresponding PCIe peer device for which the address window applies, although this is not required, as mappings between address windows and PCIe peer devices may be explicitly defined. In addition to fixed-size address windows, variable-size address windows may also be implemented.

In the illustrated example of FIG. 3, PCIe header 316 includes address field data (not shown) indicating the starting address for the cache lines comprising data 320 is in the range of Base Address+2000-2999. This results in an address "hit" for dual cast inbound write address map 322, and thus dual casting of the inbound memory write is to be performed. In instances where the address does not fall within a dual cast address window defined for a PCIe peer device, the write memory transaction is handled as a unicast transaction in the conventional manner.

In accordance with one embodiment, dual casting of an inbound memory write generates a replica of an original TLP corresponding to the inbound memory write having a header specifying an IO write transaction addressed to the PCIe peer device associated with the hit address. This is illustrated in FIG. 3 as TLP 316a, wherein the 'a' is added to TLP 316 to indicate the similarity between the two packets. It is noted that TLP 316 and TLP 316a are not completely identical, since identical packets would have identical headers, and thus would be routed to the same destination (as defined by header address information). Rather, data in applicable fields of packet header 318a of TLP 316a are changed so that TLP 316a is routed to the proper PCIe device as defined by dual cast inbound write address map 322.

Returning to dual cast inbound write address map 322, the mapping for the PCIe packet header indicates it corresponds to an inbound memory write with a starting address in the range of Base Address+2000-2999, which identifies the PCIe target device as Device 2 (i.e., PCIe device 310). Accordingly, data in PCIe header 318a is generated to map an IO write request to PCIe device 310.

In one embodiment, a 32-bit address space is used for PCIe IO devices, while a 64-bit address space is used for system memory. Accordingly, a mechanism is employed for translating the 64-bit memory address (corresponding to the starting cache line address) to a 32-bit address that will be mapped to memory in an applicable target PCIe peer device. In one embodiment, the base address and offset address ranges are configured such that the address windows for the PCIe target devices matches the offsets used by corresponding memory addresses in system memory. For example, the operating system of a platform typically allocates portions of the platform's system memory for each of multiple PCIe devices that are enumerated during system boot. The size of the memory allocation for a given PCIe device generally will depend on the particular type of the PCIe device, with some classes of devices being allocated larger blocks than others.

Figure 5:
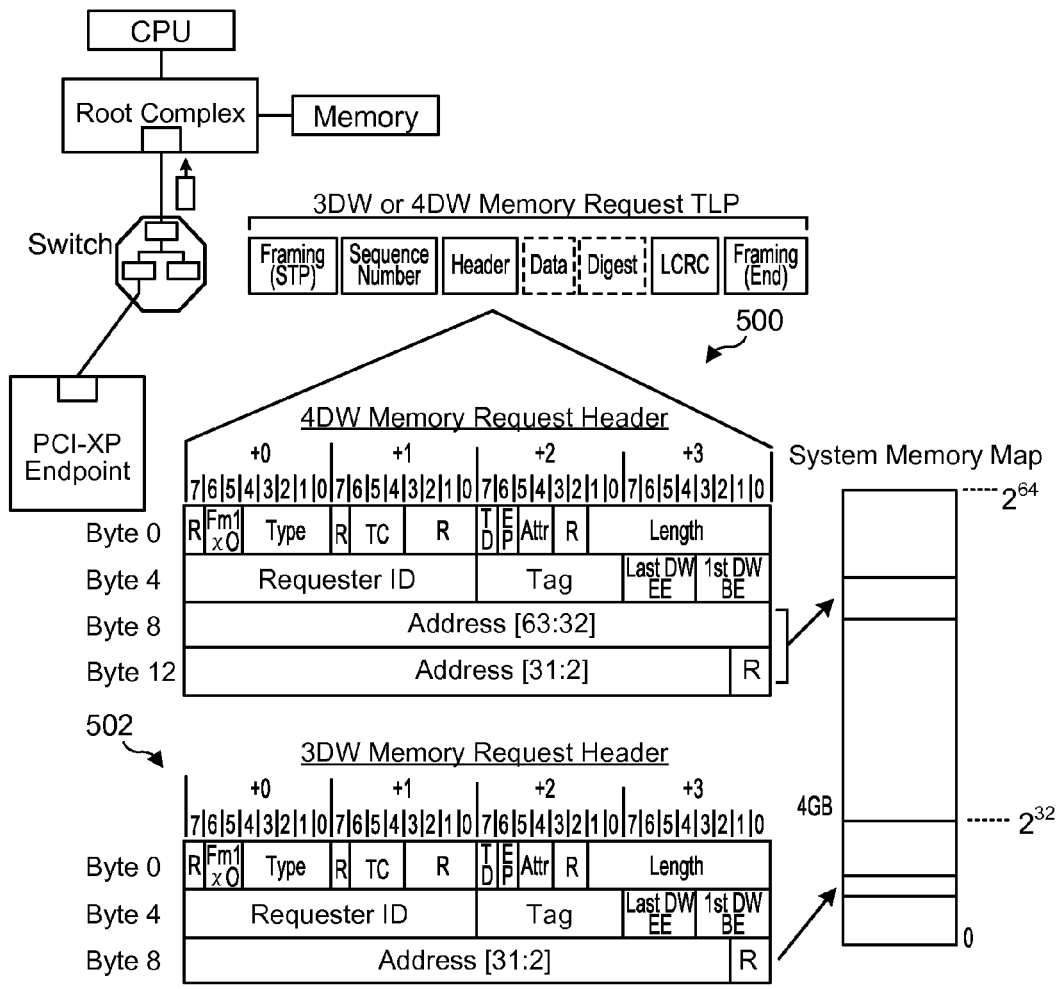
FIG. 5 is a schematic diagram illustrating details of a 3DW and 4DW memory request header associated with a 3DW or 4DW memory request Transaction Layer Packet.

An example of this addressing scheme is illustrated in FIG. 5. The upper TLP header (4DW header 500) in the diagram shows details of fields for a 64-bit memory request header, which employs four double words (4DW). The lower header (3DW header 502) shows details of fields for a 32-bit memory request header, which employs three double words (3DW). A similar 3DW addressing scheme is used for PCIe IO requests, with the difference between a memory request and an IO request defined by the value in the Type field. In one embodiment, the address specified in the Address [63:32] field beginning at Byte 8 of 4DW header 500 specifies the base address of the inbound memory write request. Meanwhile, addresses specified in the Address [31:2] fields of both 4DW header 500 and 3DW header 502 are identical and respectively define the offset address of the memory write and the 32-bit address of the IO write for the target PCIe peer device.

Returning to FIG. 3, in connection with determining applicable addresses and the target PCIe device, operations for generating dual cast TLPs are performed by PCIe dual cast logic block 300. The original TLP 316 is an inbound memory write, and accordingly, this TLP is handled in the conventional manner (from the standpoint of platform components for facilitating such transactions). Accordingly, the original TLP 316 (or a copy of TLP 316) is forwarded from PCIe dual cast logic block 300 to system agent 312. System agent 312 is illustrative of a system memory agent and/or other system entities that is/are used for translating inbound memory write requests from PCIe devices sent over PCI interconnects using the PCIe protocol to an applicable protocol (as necessary) to support corresponding system memory write transactions.

Depending on the particular platform and/or CPU (i.e. processor) architecture, system memory may or may not be accessed directly using PCIe. For example, some architectures support the Direct Memory Interface (DMI) protocol, which employs PCIe, but may use an intermediate transport protocol between the PCIe root complex and a DMI agent that, in turn, communicates with a memory controller that handles interaction with system memory to support memory transactions. It is more common that another type of interconnect and/or protocol is used for handling memory transactions, such as the architecture described below with reference to FIG. 6. A significant reason for using a different protocol for memory transactions is the need to support coherency. Thus, in modern processor architectures a coherent protocol, such as Intel® Corporation's QuickPath Interconnect® (QPI) is used. There may even be implementations where a coherent protocol, such as QPI, is implemented over PCIe interconnect wiring. In any of these cases, at some point the TLPs need to be reformatted to support a protocol other than PCIe to facilitate completion of the memory transaction. Accordingly, although depicted as a single block in FIG. 3 for simplicity and clarity, system agent 312 represents a single or combination of interfaces and/or agents between PCIe root complex 302 and system memory 314 for performing this function.

For architectures that employ a different protocol for memory transactions than PCIe, the header and payload data of TLP 316 is reformatted in accordance with the memory transaction protocol to form a memory transaction packet 326 including a memory transaction header 328. Meanwhile, the transaction payload data (e.g., data 320 comprising two cache lines) remains the same. The net result of the first half of the PCIe dual casting operation is that payload data (e.g., cache line data) of an inbound memory write TLP (316) originating from a PCIe device (308) is written into system memory at an address defined by the TLP's PCIe header (318).

The second half of the PCIe dual casting operation is employed to generate a TLP with replicated data that is targeted to a PCIe peer device, which in this example is PCIe device 310. Accordingly, PCIe dual cast logic block 300 generates a TLP 316a with a PCIe header 318a containing the remapped address derived from dual cast inbound write address map 322, which is within the address window defined for PCIe device 2 (i.e., PCIe device 310). TLP 316a is then routed via root port 306 to PCIe device 310 via PCIe link 2, and is handled at PCIe device 310 in the conventional manner used for handling IO write TLPs. As depicted, the result is that data 320 comprising the original cache line data is written into an appropriate portion of device memory 330 in PCIe device 310.

Figure 4:
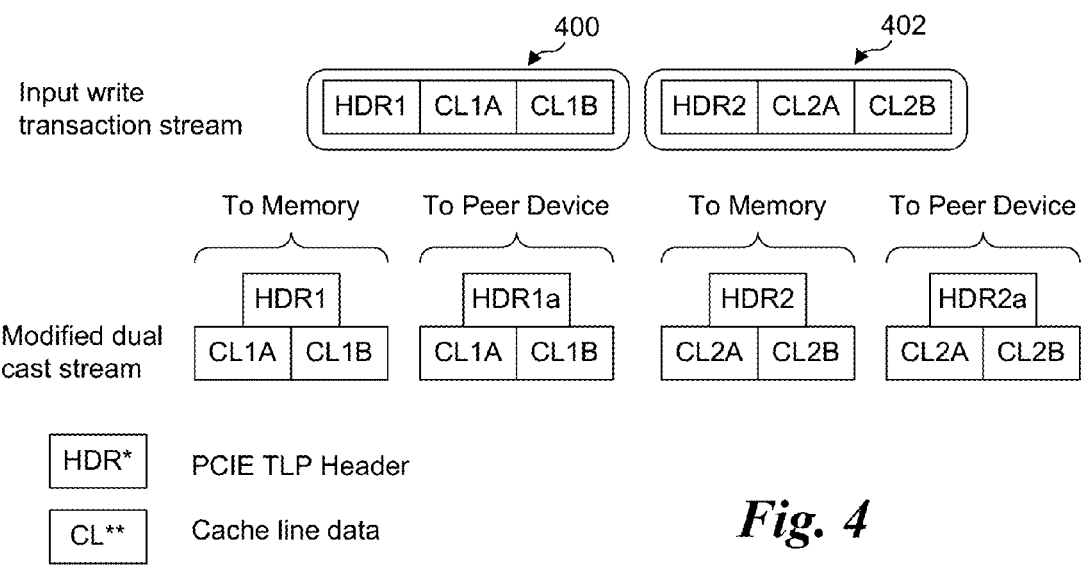
FIG. 4 illustrates dual casting of an exemplary input write transaction stream.

FIG. 4 shows an example of an input write transaction including two TLPs 400 and 402, which are processed in a manner similar to that described above for TLP 316. TLP 400 includes a PCIe Header HDR1 and data comprising cache lines CL1A and CL1B, while TLP 402 includes a PCIe Header HDR2 and data comprising cache lines CL2A and CL2B. When TLP 400 is received and processed at PCIe dual cast logic block 300, a copy of TLP 400 (or simply the original TLP 400 instance) having data including cache lines CL1A and CL1B is forwarded to system agent 312, which facilitates any applicable reformatting to generate a memory write transaction to write cache lines CL1A and CL1B into system memory 314 at the memory address specified in HDR1. Concurrently (i.e., during substantially the same time frame), a second TLP having a modified header HDR1*a* mapped to the address of PCIe device 310 and having data including cache lines CL1A and CL1B is generated from TLP 400 and sent to PCIe device 310 via root port 306 and PCIe link 2. Similar processing is performed for TLP 402, as illustrated, except in the instance the applicable headers are HDR2 and HRDR2*a*, and the applicable cache line data is CL2A and CL2B. Moreover, similar processing would be implemented for subsequent TPLs in a typical input write transaction stream used for writing to multiple cache lines or a block of system memory.

Figure 6:
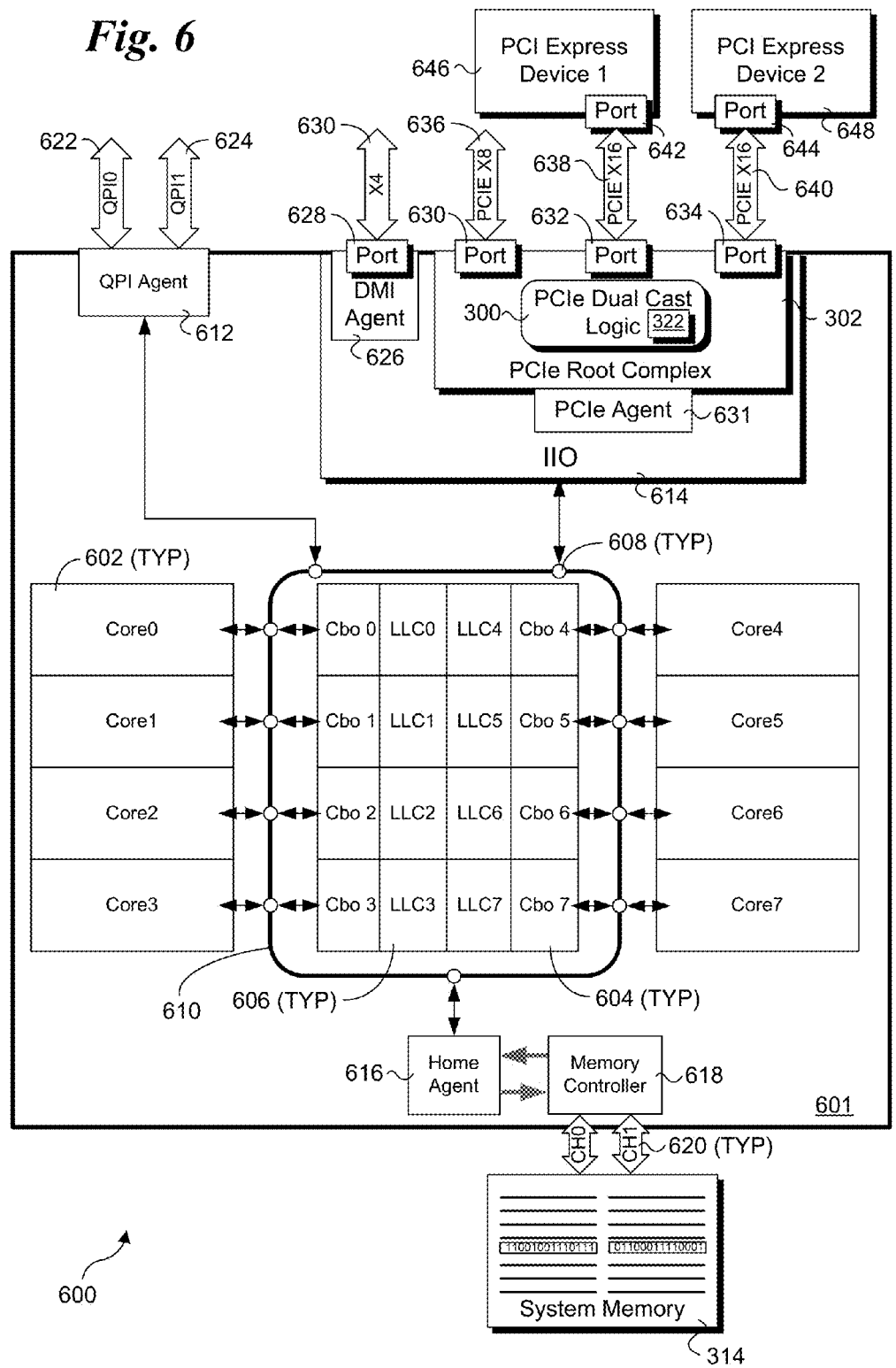
FIG. 6 is a schematic block diagram illustrating selected components of an exemplary processor and platform configuration via which aspects of the embodiments disclosed herein may be implemented.

In general, PCIe dual cast logic block 322 may be implemented in a PCIe root complex in various types of platform architectures and/or processors. Historically, PCIe root complexes where included in an IO chipset that was external to a CPU. However, today's processor architectures typically comprise System on a Chip (SoC) architectures, including on-die logic and circuitry for implementing a PCIe root complex and corresponding interfaces and agents. An example of a platform architecture including an SoC processor implementing a PCIe root complex 302 including a PCIe dual cast logic block 322 is shown in FIG. 6.

Platform architecture 600 depicts an 8-core processor 601 including processor cores 602 (labeled Core0-Core7), which are coupled to respective caching boxes 604 (labeled Cbo 0-7, also referred to as CBOXes) and last level caches (LLCs) 606 (labeled LLC0-LLC7) via nodes 608 on a ring interconnect 610. Also connected to ring interconnect 610 via corresponding nodes are a QPI agent 612, in Integrated Input/Output (ITO) block 614 and a Home Agent 616. Home agent 616 is coupled to a memory controller 618, which is used to access system memory 314 via one or more memory channels 620. QPI agent 612 is depicted as being coupled a pair of QPI links 622 and 624, enabling processor 601 to communicate with other platform components (not shown) via QPI.

In general, the components of processor 801 are interconnected via various types of interconnects, which are depicted as double-headed arrows for convenience. As discussed above, in one embodiment, processor 801 employs a ring interconnect 810. Optionally, the processor cores and related components and agents may be connected via an interconnect fabric (e.g., a 2D mesh interconnect). The interconnects may comprises point-to-point interconnects (e.g., QPI, PCIe, Intel on-chip System Fabric (IOSF), Open Core Protocol (OCP) etc.), as well as buses and other types of interconnect structures.

The IIO block in SoC processors is configured to perform IO interface operations similar to those performed by an IO chip or chipset in a conventional Northbridge/Southbridge platform architecture. However, rather than have these functions performed by a separate chip or chipset coupled to a processor via an external interconnect, they are now implemented by circuitry and logic embedded on the processor package (i.e., SoC) itself. This supports substantially higher bandwidths than available with conventional external interconnects, among other advantages.

Selected functional blocks are depicted for IIO block 614 in FIG. 6. These include a DMI agent and interface 626 including a port 628 coupled to an DMI x4 link 630. The IIO block includes a PCIe agent 631 coupled to a PCIe Root Complex 302 including a PCIe dual cast root logic block 300, and PCIe root ports 630, 632, and 634. PCIe root port 630 provides an interface to a PCIe x8 link 636. PCIe root ports 632 and 634 provide PCIe interfaces to PCIe x16 links 638 and 640, which are respectively connected to PCIe ports 642 and 644 on PCIe devices 646 and 648.

Under platform architecture 600, an inbound memory write destined for a cache line in system memory 314 is handled in the following manner. The inbound memory write is received as a TLP at one of PCIe root ports 630, 632, or 634, and forwarded to PCIe dual cast logic block 300. In response to determining the TLP is an inbound memory write addressed to a cache line having an address within the address space of system memory 312, a QPI coherent memory write transaction for writing to a cache line in system memory 314 is generated by PCI agent 321, and placed on ring 610, where it is routed to home agent 616. Home agent 616 contains cache mapping information identifying a current cache level and cache for each cache line having an address mapped to the address space of system memory 314 such that the incoming memory write data is written to the proper location. For example, a valid copy of a cache line may be located in system memory, or could be cached in an LLC or in an L1 or L2 cache that is associated with a core. In addition to home agent 616, processor 601 may also employ other caching agents (not shown in FIG. 6) to facilitate cache coherency operations. Accordingly, the location of a valid copy and state of the cache line will be determined by home agent 616 and/or other caching agents using applicable coherency messages corresponding to the QPI protocol, such as memory snoop messages. The net result is that the valid copy of the cache line gets updated, and, if the update of the cache line results in a modified cache line, a copy of the modified cache line will be written to system memory.

As discussed above, much of the functionality for facilitating dual casting of inbound to writes to memory is implemented by PCIe dual cast logic block 300. Typically, this functionality would be implemented using embedded logic corresponding to a PCIe Root Complex functional block or the like in an integrated circuit or SoC, such as processor 601. Techniques for embedding logic in functional blocks on processors and the like are well-known in the processor arts, and accordingly, additional details are not provided herein.

Under various embodiments, the first and second PCIe devices (that is, the originating device of the inbound system memory write and the recipient device of the dual cast write request) may comprise devices for which memory mapped IO space is employed. For example, the devices may comprise a pair of Network Interface Controllers (NICs), storage controllers, or Infiniband Host Adaptors.

The embodiments of PCIe dual casting disclosed herein provide significant advantages over existing techniques. In particular, the technique reduces inbound PCIe bandwidth. Under the PCIe dual cast approach, a single memory write is received as an inbound transaction and the root complex replicates this write data into two locations: the original destination (memory) and to a peer device. Under the current approach, the PCIe device would has to replicate the write data two times, doubling the bandwidth. For example, a device using dual cast would need 5 GB/s of PCIe bandwidth, while the conventional approach would require 10 GB/s.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments. The dual casting technique also is transparent to the PCIe devices, meaning the technique can be implemented with no augmentation to existing PCIe devices or their device drivers (noting the PCIe root complex itself is augmented to support dual casting). This is in sharp contrast to the proposed PCIe multicasting technique, which requires modification to one or more of the PCIe devices and drivers.

In the figures herein, elements in some cases may have the same reference number or a different reference number to suggest that the elements represented could be similar and/or different. However, an element may be flexible enough to have different implementations and work with some or all of the architectures shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; and flash memory devices.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   receiving an inbound system memory write request from a first Peripheral Component Interconnect Express (PCIe) peripheral Input/Output (IO) device; and
   dual casting a write request corresponding to the inbound system memory write request to each of system memory and a second PCIe peripheral IO device by generating, using a PCIe root complex and based on the inbound system memory write request, an IO write request for the second PCIe peripheral IO device,
   wherein the IO write request is configured to cause the second PCIe peripheral IO device to write data contained in the IO write request to memory on the second PCIe peripheral IO device when received by the second PCIe peripheral IO device, and
   wherein the PCIe root complex is a root of an I/O hierarchy that includes the first and second PCIe peripheral IO devices.

2. The method of claim 1, further comprising:
   forwarding one of the inbound system memory write request or a copy thereof to an agent configured to receive inbound system memory requests from a PCIe peripheral IO device.

3. The method of claim 2, further comprising:
   translating an address corresponding to the inbound system memory write request to an address corresponding to an IO write request for the second PCIe peripheral IO device.

4. The method of claim 2, further comprising defining address windows for which dual casting on inbound system memory write requests are to be implemented, each address window comprising a range of system memory addresses for which an inbound system memory write request having an address within the range is to be dual cast to a PCIe peripheral IO device associated with the address window.

5. The method of claim 4, wherein at least one address window is defined by an address offset and an address range offset from the address offset, the method further comprising:
   inspecting address information of the inbound system memory write request;
   determining an offset corresponding to the address information;
   determining an address offset from the address; and
   applying the address that is determined as the address for the IO write request.

6. The method of claim 5, wherein the inbound system memory write request comprises a first address field and a second address field, and the offset is defined in the first address field.

7. The method of claim 2, wherein the inbound system memory write request includes data corresponding to a first cache line and a 64-bit address identifying an system memory address for the first cache line, and wherein the IO write request includes a 32-bit address identifying an address at which data corresponding to the first cache line is to be written to the second PCIe peripheral IO device.

8. The method of claim 1, wherein each of the first and second PCIe peripheral devices are peer devices.

9. The method of claim 1, wherein each of the first and second PCIe peripheral IO devices is a Network Interface Controllers (NIC).

10. The method of claim 1, wherein each of the first and second PCIe peripheral IO devices is a storage controller.

11. The method of claim 1, wherein each of the first and second PCIe peripheral IO devices is an InfiniBand host bus adaptor.

12. The method of claim 1, wherein each of the first and second PCIe peripheral IO devices is a PCIe card configured to be installed in a PCIe expansion slot of a host device.

13. A device comprising logic including a Peripheral Component Interconnect Express (PCIe) root complex configured to:
receive an inbound system memory write request from a first PCIe peripheral IO device; and
dual cast a write request corresponding to the inbound system memory write request to each of system memory and a second PCIe peripheral Input/Output IO device by generating, using the PCIe root complex and based on the inbound system memory write request, an IO write request for the second PCIe peripheral IO device,
wherein the IO write request is configured to cause the second PCIe peripheral IO device to write data contained in the IO write request to memory on the second PCIe peripheral IO device when received by the second PCIe peripheral IO device, and
wherein the PCIe root complex is a root of an I/O hierarchy that includes the first and second PCIe peripheral IO devices,
wherein the first and second PCIe peripheral IO devices are peer devices.

14. The device of claim 13, further comprising logic configured to:
forward one of the inbound system memory write request or a copy thereof to an agent configured to receive inbound system memory requests from a PCIe peripheral IO device.

15. The device of claim 13, further comprising logic configured to:
translate an address corresponding to the inbound system memory write request to an address corresponding to an IO write request for the second PCIe peripheral IO device.

16. The device of claim 13, wherein the device is a processor.

17. A system, comprising:
a processor;
a Peripheral Component Interconnect Express (PCIe) root complex, operatively coupled to the processor and including first and second PCIe root ports;
system memory, operatively coupled to the processor; and
first and second PCIe peripheral Input/Output (IO) devices, respectively coupled to the first and second PCIe root ports, each including on-board memory;
wherein the processor includes dual cast logic configured to receive an inbound system memory write request from the first PCIe peripheral IO device and dual cast a write request corresponding to the inbound system memory write request to each of the system memory and the second PCIe peripheral IO device, wherein the write request to the second PCIe peripheral IO device is configured to cause the second PCIe peripheral IO device to write data to its on-board memory, and wherein the PCIe root complex is a root of an I/O hierarchy that includes the first and second PCIe peripheral IO devices.

18. The system of claim 17, wherein the dual cast logic is implemented in the PCIe root complex.

19. The system of claim 17, wherein the dual cast logic is further configured to:
generate, based on the inbound system memory write request, an Input/Output (IO) write request for the second PCIe peripheral IO device; and
forwarding one of the inbound system memory write request or a copy thereof to an agent in the processor configured to receive inbound system memory requests from a PCIe peripheral IO device.

20. The system of claim 19, wherein the dual cast logic is further configured to translate an address corresponding to the inbound system memory write request to an address corresponding to an IO write request for the second PCIe peripheral IO device.

21. The system of claim 19, wherein the inbound system memory write request includes data corresponding to a first cache line and a 64-bit address identifying a system memory address for the first cache line, and wherein the IO write request includes a 32-bit address identifying an address at which data corresponding to the first cache line is to be written to the second PCIe peripheral IO device.

22. The system of claim 21, wherein at least one address window is defined by an address offset and an address range offset from the address offset, and the dual cast logic is further configured to:
inspect address information of the inbound system memory write request;
determine an offset corresponding to the address information;
determine an address offset from the address; and
apply the address that is determined as the address for the IO write request.

23. The system of claim 17, wherein the processor further comprises mapping information defining address windows for which dual casting on inbound system memory write requests are to be implemented, each address window comprising a range of system memory addresses for which an inbound system memory write request having an address within the range is to be dual cast to a PCIe peripheral IO device associated with the address window.

24. The system of claim 17, wherein each of the first and second PCIe peripheral IO devices is a Network Interface Controllers (NICs).

25. The system of claim 17, wherein each of the first and second peripheral IO PCIe devices comprise is a storage controller.

26. The system of claim 17, wherein each of the first and second PCIe peripheral IO devices is an InfiniBand host bus adaptor.

27. The system of claim 17, wherein each of the first and second PCIe peripheral IO devices is a PCIe card configured to be installed in a PCIe expansion slot of a host device.

\* \* \* \* \*